US011471956B2

(12) United States Patent
Kagawa et al.

(10) Patent No.: US 11,471,956 B2
(45) Date of Patent: Oct. 18, 2022

(54) TOOL DEVICE AND REACTION BAR

(71) Applicant: FOREST RESEARCH AND MANAGEMENT ORGANIZATION, Tsukuba (JP)

(72) Inventors: Akira Kagawa, Tsukuba (JP); Takeshi Fujiwara, Tsukuba (JP)

(73) Assignee: FOREST RESEARCH AND MANAGEMENT ORGANIZATION, Tsukuba (JP)

( * ) Notice: Subject to any disclaimer, the term of this patent is extended or adjusted under 35 U.S.C. 154(b) by 48 days.

(21) Appl. No.: 16/603,902

(22) PCT Filed: Apr. 20, 2018

(86) PCT No.: PCT/JP2018/016315
§ 371 (c)(1),
(2) Date: Oct. 9, 2019

(87) PCT Pub. No.: WO2018/198977
PCT Pub. Date: Nov. 1, 2018

(65) Prior Publication Data
US 2020/0114433 A1   Apr. 16, 2020

(30) Foreign Application Priority Data
Apr. 27, 2017   (JP) .............................. JP2017-088295

(51) Int. Cl.
*B23B 45/00*   (2006.01)
*B27C 3/08*   (2006.01)
(52) U.S. Cl.
CPC .............. *B23B 45/003* (2013.01); *B27C 3/08* (2013.01)

(58) Field of Classification Search
CPC ......... B23B 45/003; B23B 45/00; B27C 3/08; B27B 17/0016; G01N 1/08; B25B 21/007; Y10T 408/957
See application file for complete search history.

(56) References Cited

U.S. PATENT DOCUMENTS 2,547,818 A     4/1951   Everett
2,552,234 A  *  5/1951   Thibodeau ............ B25B 21/007
                                                    74/421 A
(Continued)

FOREIGN PATENT DOCUMENTS

DE   3318012 A1  * 11/1984  ........... B25B 23/141
GB   2170433 A   *  8/1986  ........... B23B 45/008
(Continued)

OTHER PUBLICATIONS

PCT/IB/338, "Notification of Transmittal of Translation of the International Preliminary Report on Patentability for International Application No. PCT/JP2018/016315," dated Nov. 7, 2019.
(Continued)

*Primary Examiner* — Ryan Rufo
(74) *Attorney, Agent, or Firm* — Manabu Kanesaka

(57) ABSTRACT

A tool device has a deceleration unit, a tip tool, and a reaction bar. The deceleration unit increases a torque that is input to the deceleration unit. The tip tool is rotated when receiving a motive force from the deceleration unit. The reaction bar is fixed to the deceleration unit. An external force can be made to act on the reaction bar to receive a reaction force that is generated during rotation of the tip tool.

13 Claims, 14 Drawing Sheets

(56) References Cited

U.S. PATENT DOCUMENTS

| | | | | |
|---|---|---|---|---|
| 2,942,499 | A | * | 6/1960 | Macy ................... F16H 61/02 |
| | | | | 408/124 |
| 3,146,813 | A | * | 9/1964 | Dirksen .............. B23B 51/0426 |
| | | | | 408/206 |
| 5,919,009 | A | * | 7/1999 | Stephenson .............. G01N 1/08 |
| | | | | 408/1 R |
| 6,019,551 | A | | 2/2000 | Stephenson |
| 2004/0163214 | A1 | | 8/2004 | Cheng |
| 2005/0249564 | A1 | | 11/2005 | Van Bergen et al. |
| 2009/0194954 | A1 | * | 8/2009 | Hsu ........................ B25F 3/00 |
| | | | | 279/144 |
| 2015/0025621 | A1 | * | 1/2015 | Costello ................ A61F 2/2436 |
| | | | | 623/2.11 |
| 2019/0030622 | A1 | * | 1/2019 | Carlson .............. B23B 51/0486 |

FOREIGN PATENT DOCUMENTS

| | | |
|---|---|---|
| JP | H02-76611 A | 3/1990 |
| JP | H04-45608 U | 4/1992 |
| JP | 2001-113470 A | 4/2001 |
| JP | 2004-243486 A | 9/2004 |
| JP | 2004-276152 A | 10/2004 |
| JP | 2006-130844 A | 5/2006 |
| JP | 2016-059997 A | 4/2016 |

OTHER PUBLICATIONS

PCT/IB/373, "International Preliminary Report on Patentability for International Application No. PCT/JP2018/016315," dated Oct. 29, 2019.

PCT/ISA/237, "Written Opinion of the International Searching Authority for International Application No. PCT/JP2018/016315," dated Jul. 3, 2018.

PCT/ISA/210, "International Search Report for International Application No. PCT/JP2018/016315," dated Jul. 3, 2018.

Japan Patent Office, "Office Action for Japanese Patent Application 2019-514467" dated Nov. 30, 2021.

* cited by examiner

TO TIP TOOL (40)   TO DECELERATION UNIT (30)

⇐ TO TIP TOOL (40)   ⇒ TO DECELERATION UNIT (30)

TOOL DEVICE AND REACTION BAR

RELATED APPLICATIONS

The present application is National Phase of International Application No. PCT/JP2018/016315 filed Apr. 20, 2018, and claims priority from Japanese Application No. 2017-088295, filed Apr. 27, 2017, the disclosure of which is hereby incorporated by reference herein in its entirety.

TECHNICAL FIELD

The present embodiment relates to a tool device that rotates a tip tool to perform predetermined work and a reaction bar used in the tool device.

BACKGROUND ART

In a tree research field, a core sample of a tree is collected to measure and analyze the width of annual rings, density, stable and radioactive isotopes, concentration of inorganic elements, and other properties of the tree. Although there are a plurality of means for collecting a core sample of a tree, there is a limited number of means for collecting a core sample with little or no damage to a growing tree, and an increment borer is typically used.

An increment borer is a tool formed of a borer bit having a hollow structure with a tip portion where a threaded portion is formed, a handle attached to a base end portion of the borer bit, and an extractor insertable into the borer bit. To collect a core sample by using the increment borer, the handle is rotated clockwise to screw the tip portion of the borer bit into the tree, and a core sample is captured into the borer bit. The extractor is then inserted into the borer bit. Thereafter, the handle is rotated counterclockwise by one turn to separate the core connected to the trunk in the vicinity of the tip portion of the borer bit from the trunk, and the extractor is pulled out of the borer bit. The core sample can thus be collected. The handle has a hollow interior, whereby the increment borer can be carried with the borer bit and extractor accommodated in the handle. The work of collecting a core sample by using an increment borer is typically performed by human power. To screw the borer bit into a tree, a large torque is required, and large amounts of effort and time are spent.

In view of the circumstances described above, an extracting system for extracting a core sample of a tree by using rotation force from a motor or the like has been proposed (Patent Literature 1, for example).

CITATION LIST

Patent Literature

Patent Literature 1: U.S. Pat. No. 6,019,551

SUMMARY OF INVENTION

Technical Problem

According to Patent Literature 1, simply increasing the rotation torque of the borer is possible. Increasing the rotation torque, however, undesirably increases the reaction force that the borer bit receives from the tree accordingly. If the reaction force cannot be stably received, the borer bit cannot be correctly rotated. A larger-diameter borer bit, in particular, makes it more difficult to stably receive the reaction force that the borer bit receives from the tree if the operator merely holds the grip of a rotating drive by arms as shown in Patent Literature 1.

Solution to Problem

An embodiment relates to a tool device including a deceleration unit, a tip tool, and a reaction bar. The deceleration unit increases a torque input to the deceleration unit. The tip tool rotates upon reception of a motive force from the deceleration unit. The reaction bar is fixed to the deceleration unit. The reaction bar is used to allow an operator or a fixed object, such as the ground and a tree, to stably receive a reaction force produced when the tip tool rotates. The deceleration unit can be linked to a motive force tool and can increase a torque input from the motive force tool.

The reaction bar can be fixed to the deceleration unit with the reaction bar extending in a direction perpendicular to an axis of rotation of the tip tool. The tip tool can be a borer bit having a hollow structure and used as an increment borer.

The tool device according to the embodiment may further include a socket. A base end portion of the tip tool is attached to the socket, and the socket rotates along with the tip tool upon reception of a rotational force from the deceleration unit. The socket includes an engagement section that engages with a rope. The rope is wound around a workpiece to be bored by rotating the tip tool.

When the socket rotates along with the rotation of the tip tool, the rope is wound around the outer circumferential surface of the tip tool. Winding the rope around the outer circumferential surface of the tip tool allows the rope to be bound around the surface of a workpiece (tree, for example) and the socket to be moved toward the workpiece, whereby a tip portion of the tip tool can be pressed against the workpiece via the socket. The workpiece can thus be readily bored with the tip tool.

The tool device may further include a stopper member for fixing the base end portion of the tip tool to the socket. The stopper member engages with a groove formed in an outer surface of the tip tool and comes into contact with the socket to prevent the tip tool from disengaging from the socket. An operator can pull the tip tool from the workpiece, such as a tree, by pulling the tip tool in the direction away from the workpiece via the socket. The stopper member can be rotatably attached to the socket. The stopper member can rotate between a position where the stopper member engages with the groove of the tip tool and a position where the stopper member retracts from the groove of the tip tool.

The socket may include a first sub-socket and a second sub-socket. The first sub-socket and the second sub-socket are so disposed as to surround the base end portion of the tip tool around the axis of rotation of the tip tool. The tool device can be further provided with a clamp for fixing the first sub-socket and the second sub-socket to each other.

The reaction bar may include a first reaction bar fixed to the deceleration unit and at least one second reaction bar detachably attached to the first reaction bar. In a case where two second reaction bars are used, the two second reaction bars can be attached to different positions on the first reaction bar and disposed along a direction perpendicular to the axis of rotation of the tip tool.

The reaction bar may include a first reaction bar fixed to the deceleration unit and a second reaction bar rotatably linked to the first reaction bar. When the first reaction bar moves along the axis of rotation of the tip tool, the second reaction bar may incline with respect to the first reaction bar. The first reaction bar can thus be smoothly moved when the tip tool rotates.

The reaction bar may include a first reaction bar fixed to the deceleration unit, a second reaction bar rotatably linked to the first reaction bar, and a spring mechanism. The spring mechanism makes the first reaction bar and the second reaction bar integrally movable based on an urging force produced by a spring in a case where a torque acting on the first reaction bar is smaller than a predetermined torque when the tip tool rotates. On the other hand, the spring mechanism causes the first reaction bar and the second reaction bar to rotate relative to each other against the urging force produced by the spring in a case where the torque is greater than or equal to the predetermined torque. The operator of the tool device can recognize that a torque greater than or equal to the predetermined torque has occurred when the first reaction bar and the second reaction bar are rotated relative to each other.

The second reaction bar may include a plurality of rod-shaped members and an operation member operated by the operator. The plurality of rod-shaped members are movable relative to each other along a longitudinal direction of the second reaction bar. The operation member is operated by the operator to a position where the plurality of rod-shaped members are allowed to move relative to each other or a position where the plurality of rod-shaped members are fixed to each other. As a result, the length of the second reaction bar can be adjusted in accordance with the position where the tip tool is used, whereby work using the tip tool can be efficiently performed. In a case where the length of the second reaction bar is so adjusted that the lower end of the second reaction bar comes into contact with the ground when the tool device is used, the deceleration unit and other components can be supported by the second reaction bar. As a result, the operator does not need to keep lifting the deceleration unit and other components in a predetermined position separate from the ground, whereby the physical burden on the operator can be reduced.

The first reaction bar may be provided with a connection hole. The base end portion of the tip tool is inserted into the connection hole, so that the connection hole is connected to the base end portion of the tip tool. Connecting the base end portion of the tip tool to the connection hole allows the first reaction bar to rotate the tip tool.

Another embodiment relates to a reaction bar, and the reaction bar is fixed to a deceleration unit that increases an input torque. Since a reaction force is produced when a tip tool rotates upon reception of a motive force from the deceleration unit, the reaction bar is used to allow an operator or a fixed object, such as the ground and a tree, to stably receive the reaction force. The reaction bar may include a first reaction bar fixed to the deceleration unit and at least one second reaction bar detachably attached to the first reaction bar. The reaction bar may be fixed to the deceleration unit with the reaction bar extending in a direction perpendicular to an axis of rotation of the tip tool.

The second reaction bar may include a plurality of rod-shaped members and an operation member operated by an operator, as in the above embodiment. The plurality of rod-shaped members may be movable relative to each other along a longitudinal direction of the second reaction bar. The operation member is operated by the operator to a position where the plurality of rod-shaped members are allowed to move relative to each other or a position where the plurality of rod-shaped members are fixed to each other.

Effects of Invention

According to the embodiment, when the deceleration unit increases the rotation torque of the tip tool, the reaction bar can be used to stably support a reaction force produced when the tip tool rotates. The configured reaction bar thus allows the tip tool to rotate with the increased torque maintained.

DESCRIPTION OF EMBODIMENTS

Figure 1:
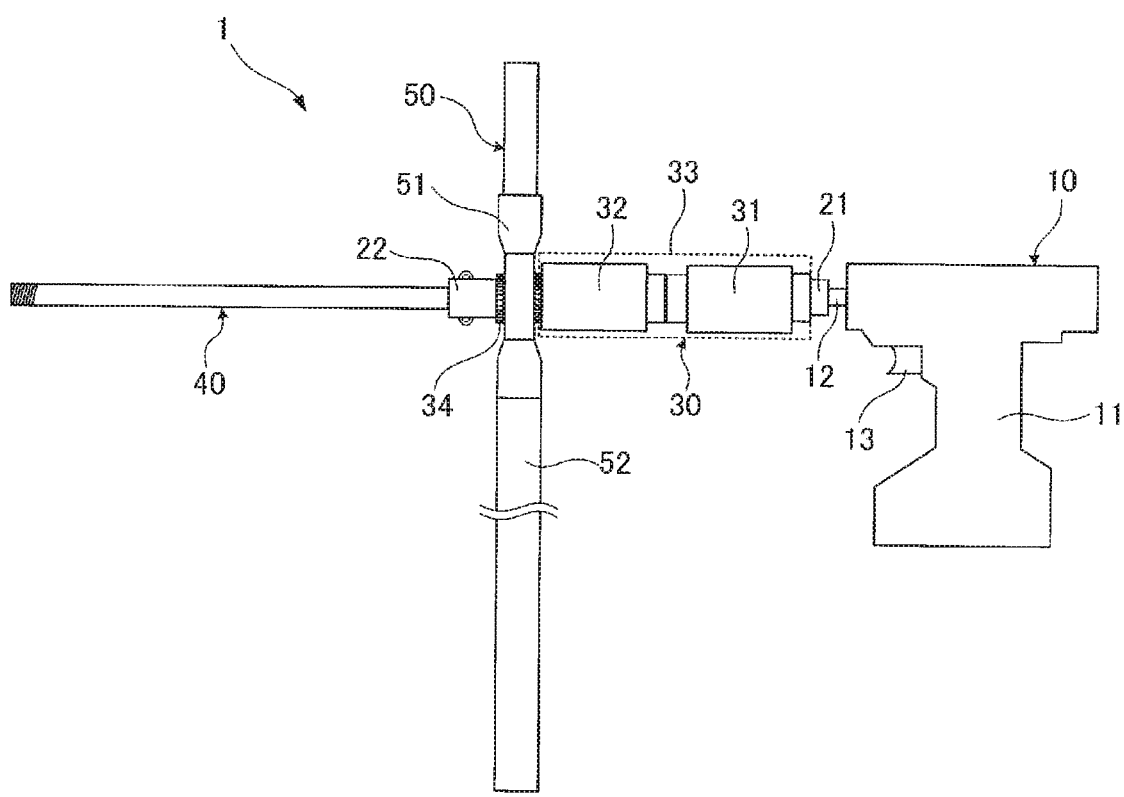
FIG. 1 is a side view of a tool device.

A tool device that is an embodiment will be described. A tool device 1 includes a motive force tool 10, a deceleration unit 30, a tip tool 40, and a reaction bar 50, as shown in FIG. 1.

The structure of the motive force tool 10 will first be described (by way of example). The motive force tool 10 only needs to produce a rotation force to be transmitted to the deceleration unit 30, which will be described later. For example, a commercially available motive force tool 10 can be used.

A grip 11 of the motive force tool 10 is held by an operator. The motive force tool 10 includes a square drive 12, and a first socket 21, which will be described later, is attached to the square drive 12. A switch 13 of the motive force tool 10 is operated by the operator to rotate the first socket 21 attached to the square drive 12.

The motive force tool 10 can also be provided with a switch (not shown) for switching the rotational direction of the square drive 12 (forward direction or reverse direction). The power supply for the motive force tool 10 can be built in the motive force tool 10 or detachably attached to the motive force tool 10. Instead, a power supply external to the motive force tool 10 (external power supply) may supply the motive force tool 10 with electric power. A power supply built in the motive force tool 10 or a power supply detachably attached to the motive force tool 10 allows use of the motive force tool 10 even in an environment with no external power supply.

Figure 2:
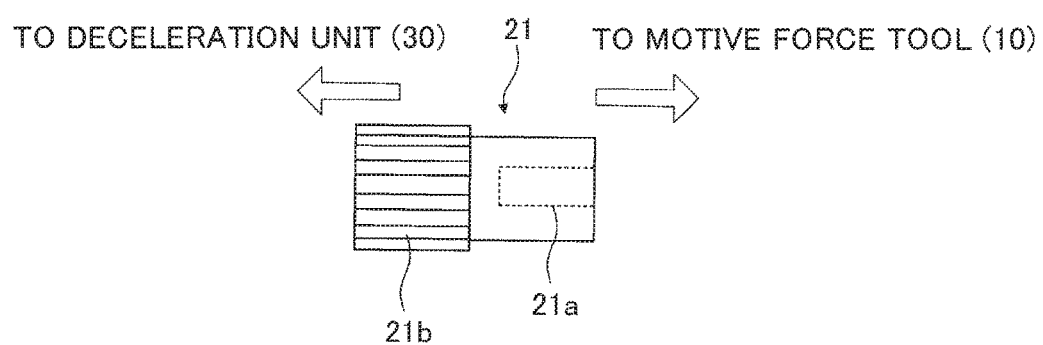
FIG. 2 is a side view of a first socket.

The first socket 21 has a groove 21a, into which a tip portion of the square drive 12 is inserted, as shown in FIG. 2. When the tip portion of the square drive 12 engages with the groove 21a, the first socket 21 rotates along with the square drive 12. A gear 21b is formed around the outer circumferential surface of the first socket 21, and the gear 21b is used to transmit a rotation force from the first socket 21 to the deceleration unit 30.

The structure of the deceleration unit 30 will next be described.

When the rotation torque from the motive force tool 10 is transmitted to the deceleration unit 30, the deceleration unit 30 reduces the rotational speed to increase rotation torque. The deceleration unit 30 includes a first deceleration mechanism 31 and a second deceleration mechanism 32, which are accommodated in an enclosure 33. The first deceleration mechanism 31 and the second deceleration mechanism 32 are disposed side by side along the axis of rotation of the square drive 12. The first deceleration mechanism 31 and the second deceleration mechanism 32 are each a known deceleration mechanism, such as a planetary gear mechanism and a multi-stage gear mechanism.

An input gear (not shown) of the first deceleration mechanism 31 engages with the gear 21b of the first socket 21, and the first deceleration mechanism 31 increases the rotation torque from the first socket 21. The first deceleration mechanism 31 and the second deceleration mechanism 32 are linked to each other via a socket (not shown), and the rotational force from the first deceleration mechanism 31 is transmitted to the second deceleration mechanism 32. The structure that links the first deceleration mechanism 31 and the second deceleration mechanism 32 to each other only needs to be a structure capable of transmitting the rotational force from the first deceleration mechanism 31 to the second deceleration mechanism 32, and a known structure can be employed as appropriate in consideration of this point. The second deceleration mechanism 32 increases the rotation torque from the first deceleration mechanism 31.

According to the present embodiment, the two deceleration mechanisms 31 and 32 are used to increase the rotation torque from the motive force tool 10. The deceleration unit 30 including the two deceleration mechanisms 31 and 32 may have a deceleration ratio ranging, for example, from 20.25 to 484. The two deceleration mechanisms 31 and 32 are used in the present embodiment. Instead, one deceleration mechanism or three or more deceleration mechanisms may be used. In the case where one deceleration mechanism is used, a deceleration mechanism having a desired deceleration ratio can be selected from a plurality of types of deceleration mechanism having different deceleration ratios. In the case of one deceleration mechanism, the deceleration ratio may range from 4.5 to 22. In the case where the two deceleration mechanisms 31 and 32 are combined with each other, the deceleration ratio may range from 20.25 (that is, 4.5×4.5) to 484 (that is, 22×22). To collect a core sample of a tree by using the tool device 1, as will be described later, a sufficient deceleration ratio of the deceleration unit 30 is 99 or smaller although depending on the rotation torque of the motive force tool 10.

A spline 34 is provided on the one-end-side outer surface (surface facing tip tool 40) of the deceleration unit 30. The spline 34 differs from gears that form the first deceleration mechanism 31 and the second deceleration mechanism 32. The reaction bar 50, which will be described later, is detachably attached to the spline 34.

Figure 3:
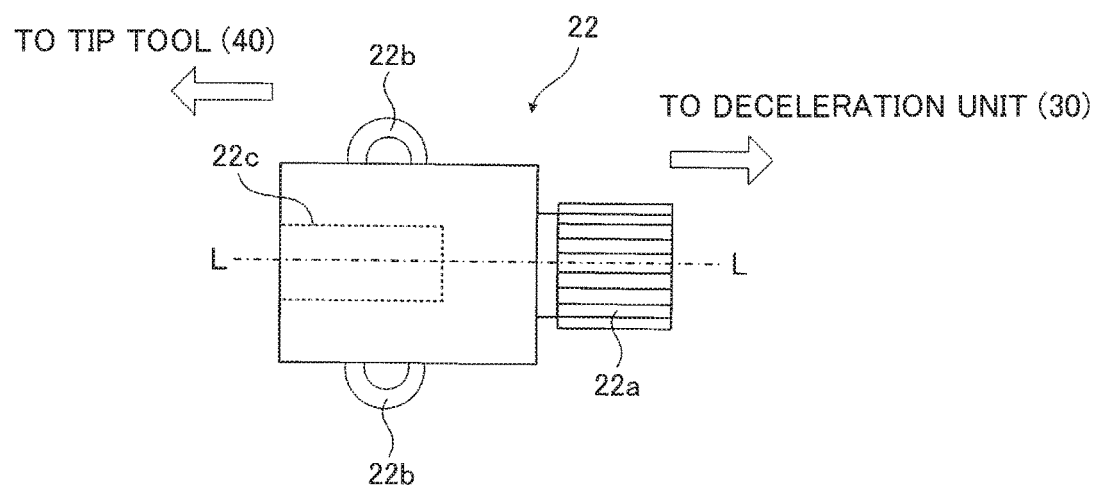
FIG. 3 is a side view of a second socket.

A second socket 22 is linked to an output spline (not shown) of the second deceleration mechanism 32, and the second socket 22 rotates when it receives the rotational force from the second deceleration mechanism 32. The second socket 22 includes a spline 22a, which engages with an output gear of the second deceleration mechanism 32, as shown in FIG. 3. The second socket 22 may have any structure linkable to the second deceleration mechanism 32. The structure that links the second socket 22 and the second deceleration mechanism 32 to each other is, for example, a linkage structure formed of a male portion and a female portion into which the male portion is inserted.

A pair of rings (corresponding to engagement portion) 22b are provided on the outer circumferential surface of the second socket 22 excluding the spline 22a. The pair of rings 22b are so disposed as to be symmetric with respect to an axis of rotation L of the second socket 22. A rope is inserted into a hole formed inside each of the rings 22b, as will be described later. The second socket 22 only needs to be provided with at least one ring 22b. The position where the at least one ring 22b is provided on the second socket 22 can be determined as appropriate.

The second socket 22 has a linkage groove 22c, to which a base end portion of the tip tool 40 is detachably attached. When the tip tool 40 is attached to the linkage groove 22c, the tip tool 40 rotates along with the second socket 22.

In the present embodiment, a variety of types of work can be performed by rotating the tip tool 40. For example, causing a tip portion of the tip tool 40 to penetrate into a workpiece allows boring a hole in the workpiece. The material of the workpiece is not limited to a specific material and may, for example, be wood, concrete, resin, and metal. The material and strength of the tip tool 40 can be determined as appropriate in accordance with the material of the workpiece. On the other hand, causing the tip portion of the tip tool 40 to engage with a bolt allows fastening of the bolt. In this case, the tip portion of the tip tool 40 may be so shaped as to be engageable with the bolt.

According to the present embodiment, in which the torque output from the motive force tool 10 is increased by the deceleration unit 30 and then transmitted to the tip tool 40, the rotation torque of the tip tool 40 can be increased. Work using the tip tool 40 (boring and fastening) can therefore be readily performed.

For example, to perform boring, the tip portion of the tip tool 40 is readily allowed to penetrate into the workpiece. In this process, the higher the hardness of the workpiece, and/or the greater the diameter of the tip tool 40, the harder the boring of the workpiece with the tip tool 40, but the higher the rotation torque of the tip tool 40, the easier the boring of the workpiece. On the other hand, to perform fastening, a bolt can be fastened with a large, accurate torque.

In the present embodiment, the motive force tool 10 is linked to the deceleration unit 30, and the rotation torque of the motive force tool 10 is transmitted to the deceleration unit 30, but not necessarily. Specifically, in the present embodiment, the deceleration unit 30 and the motive force tool 10 are configured to be separate components. The deceleration unit 30 and the motive force tool 10 can instead be integrated with each other. Further, a handle (not shown) rotationally operated by the operator can be linked to the deceleration unit 30, and rotation torque produced when the operator rotationally operates the handle can be transmitted to the deceleration unit 30. To link the handle to the deceleration unit 30, the handle can be directly linked to the deceleration unit 30, or the handle can be indirectly linked to the deceleration unit 30 via a linkage member, such as the socket 21 having been described in the present embodiment.

The structure of the reaction bar 50 will next be described.

When the tip tool 40 is rotated, the tip tool 40 receives a reaction force in the direction opposite the rotational direction of the tip tool 40 from the workpiece. The reaction bar 50 is used to stably receive the reaction force and rotate the tip tool 40. The reaction bar 50 is formed of a reaction bar body 51 (corresponding to first reaction bar) and a support bar 52 (corresponding to second reaction bar).

Figure 4:
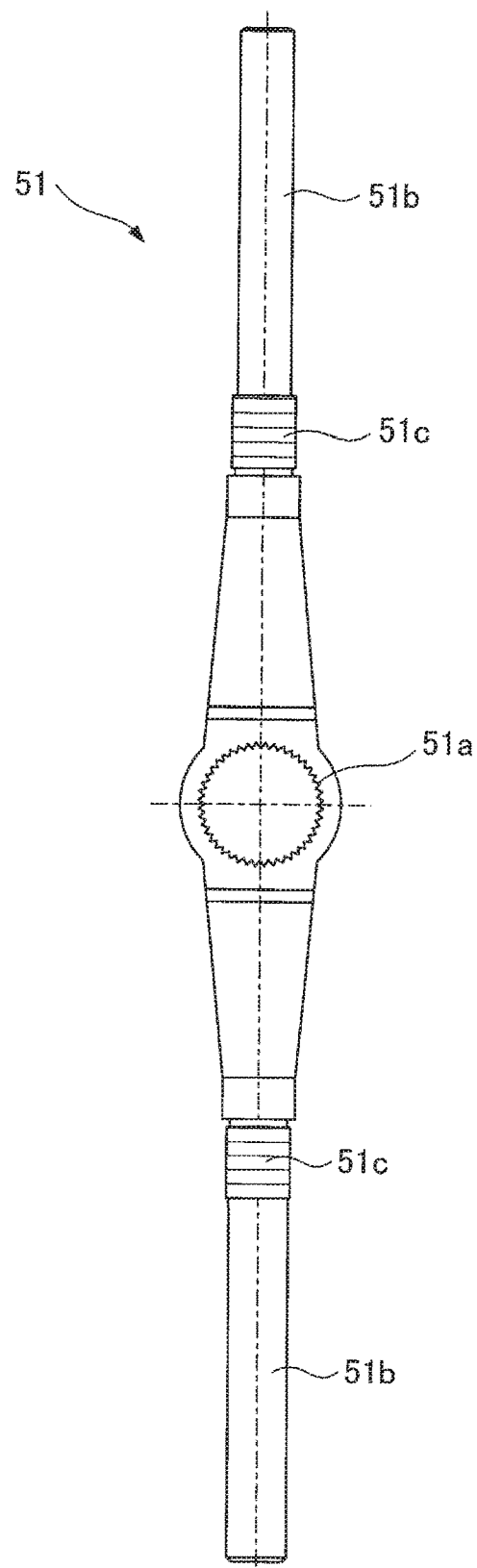
FIG. 4 is a front view of a reaction bar body.

The reaction bar body 51 has a linkage hole 51a, and a spline is formed on the wall surface of the linkage hole 51a, as shown in FIG. 4. The spline 34 of the deceleration unit 30 described above is inserted into the linkage hole (spline) 51a and engages therewith so that the reaction bar body 51 is linked to the deceleration unit 30. When the linkage hole (spline) 51a engages with the spline 34 of the deceleration unit 30, the deceleration unit 30 and the reaction bar body 51 are fixed to each other in the rotational direction of the tip tool 40.

The reaction bar body 51 includes a pair of linkage bars 51b. The pair of linkage bars 51b extend from the linkage hole 51a in opposite directions (upward/downward directions in FIG. 4) and are disposed along the same straight line. When the reaction bar body 51 is attached to the deceleration unit 30, the pair of linkage bars 51b extend in the direction perpendicular to the axis of rotation of the tip tool 40. To perform work using the tip tool 40, the reaction bar body 51 is so attached to the deceleration unit 30 that one of the linkage bars 51b extends upward and the other linkage bar 51b extends downward.

The support bar 52 shown in FIG. 1 can be attached to each of the linkage bars 51b. In the example shown in FIG. 1, the support bar 52 is attached to the linkage bar 51b extending downward. The support bar 52 has a hollow structure, and the linkage bar 51b can be inserted into the support bar 52. The support bar 52 can be a handle of an increment borer having a hollow structure (handle described in Background Art).

The reaction bar body 51 includes two threaded portions 51c, which are formed at base end portions of the linkage bars 51b, respectively. A threaded portion (not shown) that engages with either of the threaded portions 51c is formed on the inner circumferential surface of the support bar 52, and causing the threaded portion of the support bar 52 to engage with the threaded portion 51c allows the support bar 52 to be fixed to the reaction bar body 51. Also, in the case where the handle of the increment borer is used as the support bar 52 as described above, causing a threaded portion formed on the inner circumferential surface of the handle to engage with the threaded portion 51c allows the handle to be fixed to the reaction bar body 51.

In the present embodiment, either of the threaded portions 51c is used to fix the support bar 52 to the reaction bar body 51, but not necessarily. Any structure capable of fixing the support bar 52 to the reaction bar body 51 may be employed. For example, a hole can be formed in each of the linkage bars 51b and the support bar 52, and one of the linkage bars 51b of the reaction bar body 51 can be so inserted into the support bar 52 that the holes coincide with each other, followed by insertion of a pin into the holes. The structure described above also allows the support bar 52 to be fixed to the reaction bar body 51.

In the present embodiment, one of the linkage bars 51b is inserted into the support bar 52, but not necessarily. Specifically, the linkage bars 51b can be configured to each have a hollow structure, and one end portion of the support bar 52 can be inserted into one of the linkage bar 51b.

In the present embodiment, in which the rotation torque of the tip tool 40 is increased as described above, the reaction force acting on the tip tool 40 is likely to increase when work using the tip tool 40 is performed. The operator holds the grip 11 of the motive force tool 10, but it is difficult to stably receive the reaction force acting on the tip tool 40 if the operator merely holds the grip 11. To solve the problem, the reaction bar 50 is used in the present embodiment to more readily achieve stabler reception of the reaction force acting on the tip tool 40.

To perform work using the tip tool 40, the reaction bar 50 attached to the deceleration unit 30 attempts to rotate in the same direction of the reaction force acting on the tip tool 40. The reaction force acting on the tip tool 40 can be stably received by supporting the support bar 52 in such a way that the reaction bar 50 does not rotate. Since the torque is the product of the distance from the axis of rotation of the tip tool 40 and the force acting on a portion of the support bar 52 that is the portion corresponding to the distance described above, supporting a tip portion of the support bar 52 that is the portion farthest from the axis of rotation of the tip tool 40 more readily allows stabler reception of the reaction force acting on the tip tool 40. In the configuration shown in FIG. 1, the support bar 52 can instead be attached to the linkage bar 51b extending upward from the deceleration unit 30, and the attached support bar 52 can be supported. As described above, the operator's holding of the grip 11 and the supporting of the support bar 52 more readily allow stabler reception of the reaction force acting on the tip tool 40, whereby the tip tool 40 is rotated more easily.

In the present embodiment, the reaction bar body 51 and the support bar 52 are configured to be separate parts. The reaction bar body 51 and the support bar 52 may instead be integrated with each other. It is, however, noted that the configuration in which the reaction bar body 51 and the support bar 52 are separate parts allows the reaction bar 50 to be divided into the reaction bar body 51 and the support bar 52 in a compact package, whereby the reaction bar 50 can be readily carried or otherwise handled.

In the present embodiment, the reaction bar body 51 is provided with the two linkage bars 51b but may instead be provided with only one linkage bar 51b. In this case, the reaction bar body 51 can be so attached to the deceleration unit 30 that the linkage bar 51b extends downward, as described above. When the reaction bar body 51 is attached to the deceleration unit 30, the linkage bar 51b extends in the direction perpendicular to the axis of rotation of the deceleration unit 30. The direction in which the linkage bar 51b extends may instead incline with respect to the axis of rotation of the deceleration unit 30.

In the present embodiment, the support bar 52 is fixed only to the linkage bar 51b extending downward, out of the two linkage bars 51b, but not necessarily. That is, another support bar 52 can be fixed also to the linkage bar 51b extending upward. In this case, the two support bars 52 fixed to the two linkage bars 51*b* can be used to stably receive the reaction force acting on the tip tool 40. Supporting two support bars 52 more readily suppress shift of the axis of rotation of the tip tool 40, as compared with the case where one support bar 52 is supported, whereby the axis of rotation of the tip tool 40 can be so maintained in a desired orientation that the tip tool 40 reaches a target position of a workpiece (pith located at center of trunk, for example). The support bar 52 fixed to the linkage bar 51*b* extending upward can be a handle of an increment borer having a hollow structure (handle described in Background Art).

To collect a core sample of a tree by using the tool device 1 according to the present embodiment, a borer that forms part of an increment borer can be used as the tip tool 40. An increment borer is formed of a borer, an extractor, and a handle, as described above. The borer has a hollow structure with an opening formed at the tip of the borer and a threaded portion formed on an outer circumferential surface of a tip side of the borer. When the motive force tool 10 is activated to rotate the tip tool (borer) 40 clockwise, the tip portion of the tip tool (borer) 40 travels toward the interior of the tree. A core sample of the tree can thus be captured in the tip tool (borer) 40.

After the tip portion of the tip tool (borer) 40 penetrates to a target position in the tree, the base end portion of the tip tool (borer) 40 is removed from the second socket 22 to extract the core sample of the tree. Thereafter, the handle (not shown) is attached to the base end portion of the tip tool (borer) 40, and the extractor is inserted into the tip tool (borer) 40 via the base end portion. The handle is then rotated counterclockwise by one turn to separate the core connected to the trunk in the vicinity of the tip portion of the tip tool (borer) 40 from the trunk. The extractor is then pulled out of the tip tool (borer) 40, whereby the core sample of the tree can be taken out with the sample placed on the extractor.

Figure 5:
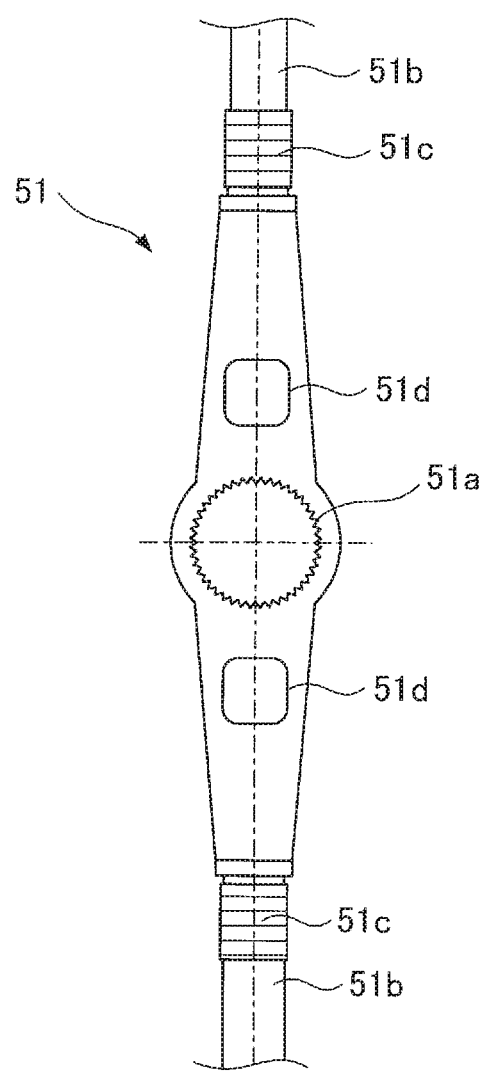
FIG. 5 shows a variation of the reaction bar body.

To separate the core connected to the trunk in the vicinity of the tip portion of the tip tool (borer) 40 from the trunk, the reaction bar body 51 shown in FIG. 5 can be used instead of using the handle (not shown) attached to the base end portion of the tip tool (borer) 40. In FIG. 5, the reaction bar body 51 has connection holes 51*d*, into which the base end portion of the tip tool (borer) 40 is inserted. The connection holes 51*d* each have a shape that conforms to the base end portion of the tip tool (borer) 40.

After the base end portion of the tip tool (borer) 40 from which the second socket 22 has been removed is inserted into one of the connection holes 51*d*, the reaction bar body 51 is rotated around the axis of rotation of the tip tool (borer) 40, whereby the core connected to the trunk in the vicinity of the tip portion of the tip tool (borer) 40 can be separated from the trunk. Forming the reaction bar body 51 with metal allows improvement in the strength of the reaction bar body 51, whereby plastic deformation of the reaction bar body 51 can be avoided when the reaction bar body 51 is rotated.

In the example shown in FIG. 5, two connection holes 51*d* are formed in the reaction bar body 51, and the number of connection holes 51*d* can be determined as appropriate. That is, the number of connection holes 51*d* may be one or plural. In the case where a plurality of connection holes 51*d* are formed, the plurality of connection holes 51*d* can be arranged along the longitudinal direction of the reaction bar body 51 (upward/downward direction in FIG. 5).

After the core sample of the tree is taken out, and when the tip tool (borer) 40 is rotated in the direction (counterclockwise, for example) opposite the direction in which the tip tool (borer) 40 is rotated when the tip tool (borer) 40 is caused to penetrate into the tree, the threaded portion formed at the tip portion of the tip tool (borer) 40 engages with the tree, whereby the tip tool (borer) 40 can be pulled out of the tree. The tool device 1 according to the present embodiment can be used also when the tip tool (borer) 40 is pulled out of the tree. In this case, the deceleration unit 30 amplifies the rotation torque of the tip tool (borer) 40, whereby the tip tool (borer) 40 can be readily pulled out of the tree.

On the other hand, in a case where the interior of the tree has decayed or the like, and in a case where the threaded portion of the tip tool (borer) 40 is located in the decayed portion, the threaded portion of the tip tool (borer) 40 cannot engage with the tree, so that the tip tool (borer) 40 undesirably idles, resulting in a situation in which the tip tool (borer) 40 cannot be pulled out of the tree in some cases. In such cases, the tip tool (borer) 40 can be pulled out of the tree by using an extractor device described in "An Extractor Device for Stuck or Broken Increment Borers, N. J. Loader and J. S. Waterhouse, Tree-Ring Research July 2014, Vol. 70, Issue 2, pg(s) 157-160." The extractor device causes a chuck to catch part of the tip tool (borer) 40 protruding from the tree and moves the chuck in the direction away from the tree to pull the tip tool (borer) 40 out of the tree. The structure that moves the chuck in the direction away from the tree is not limited to the structure described in the literature described above and may be any structure in which the tree receives reaction force produced when the chuck is moved.

Figure 6:
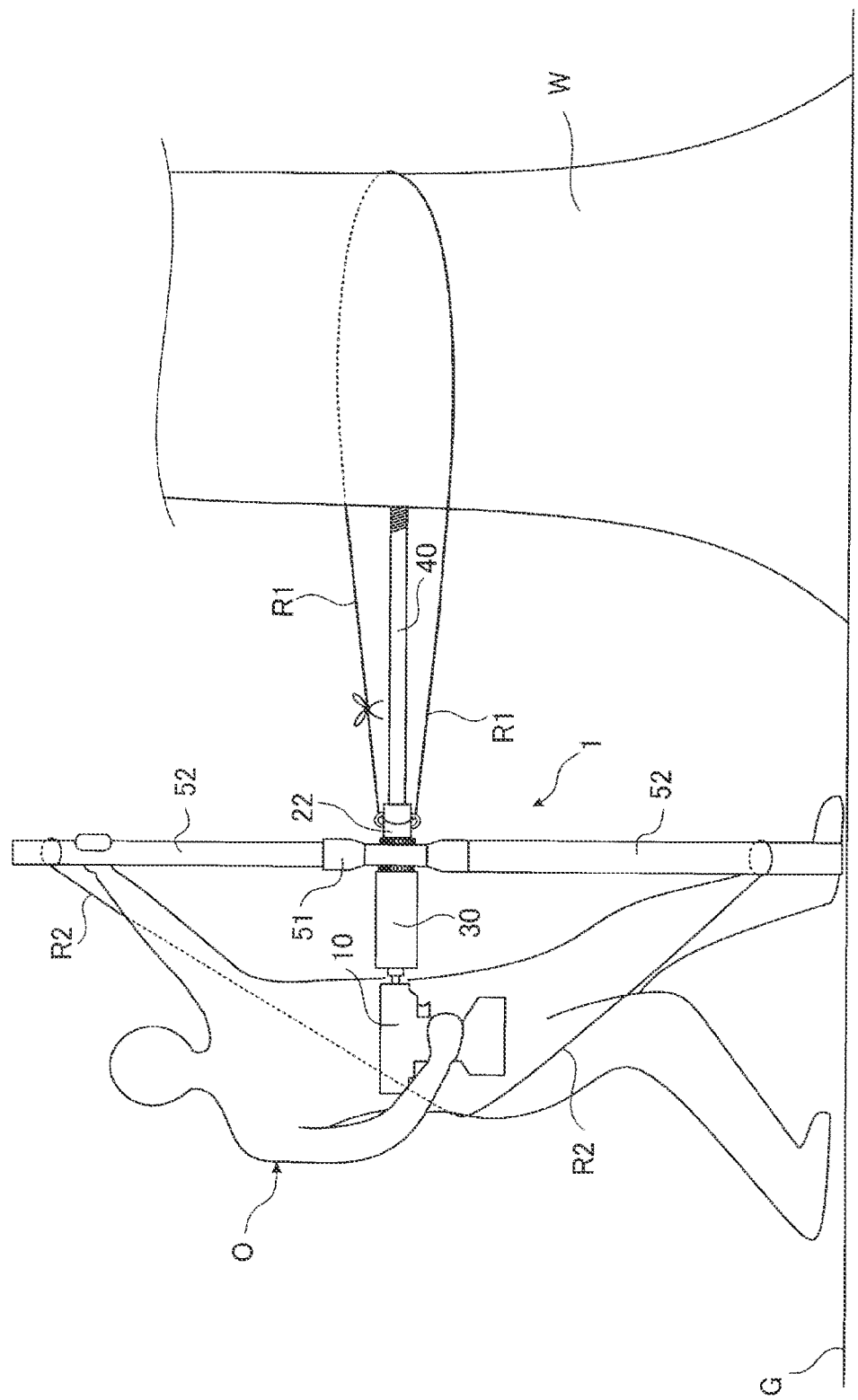
FIG. 6 shows a state in which the tool device is used to collect a core sample of a tree.

To collect a core sample of a tree, a rope can be used. Specifically, as shown in FIG. 6, a rope R1 is disposed around the circumference of a tree W, and one end of the rope R1 is sequentially caused to pass through the pair of rings 22*b* of the second socket 22. Thereafter, the one end of the rope R1 is connected to the other end of the rope R1 to loop the rope R1. The rope R1 only needs to be attached to the pair of rings 22*b* of the second socket 22, and the method described above is not necessarily employed. For example, the opposite ends of the rope R1 can be caused to pass through the pair of rings 22*b*, and the rope R1 can be fixed to the pair of rings 22*b*.

When the tip tool (borer) 40 is rotated with the rope R1 passing through the two rings 22*b*, the rope R1 is wound around the outer circumferential surface of the tip tool (borer) 40 in accordance with the rotation of the second socket 22. Winding the rope R1 around the outer circumferential surface of the tip tool (borer) 40 allows the rope R1 to be bound around the surface of the tree W and the second socket 22 to be moved toward the tree W, whereby the tip portion of the tip tool (borer) 40 can be pressed against the tree W via the second socket 22. Pressing the tip portion of the tip tool (borer) 40 against the tree W allows the tip portion of the tip tool (borer) 40 to be readily inserted into the tree W.

Figure 7:
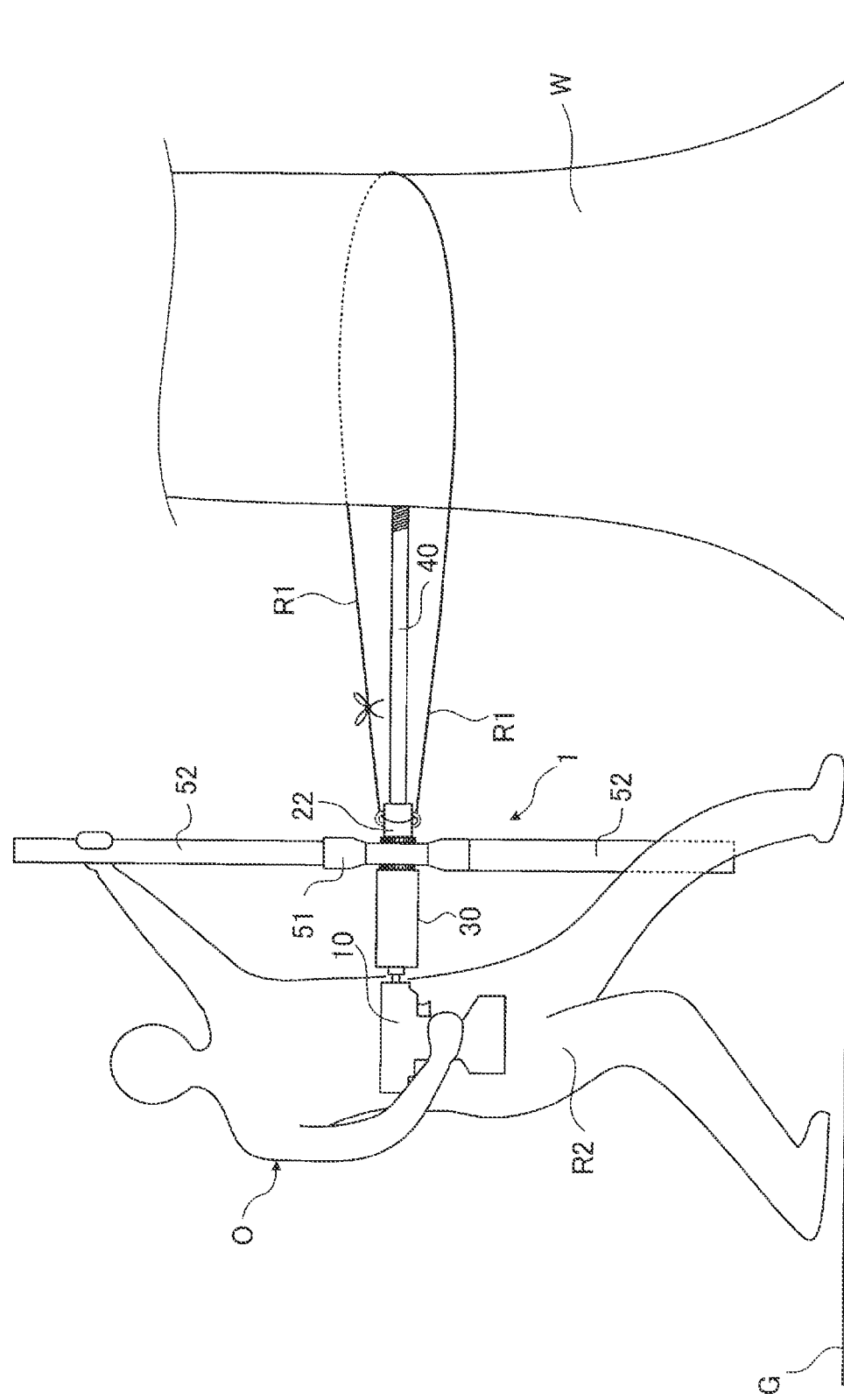
FIG. 7 shows another state in which the tool device is used to collect a core sample of a tree.

When the tip portion of the tip tool (borer) 40 is inserted into the tree W, the tip tool (borer) 40 receives reaction force from the tree W as described above, and the reaction bar 50 therefore undesirably rotates in the direction in which the reaction force acts. The rotation of the reaction bar 50 can be avoided by supporting the support bar 52 located below the reaction bar body 51 with a leg of an operator O, whereby the reaction force from the tree W can be stably received. The operator O can prevent the rotation of the reaction bar 50 by supporting the support bar 52 located below the reaction bar body 51 with a leg of the operator O in the attitude shown in FIG. 7 to stably receive the reaction force from the tree W.

Means for supporting the support bar 52 is not limited to a leg of the operator O and may be any object capable of preventing the support bar 52 from moving when the reaction bar 50 rotates.

For example, one end of a rope R2 is joined to the support bar 52 located above the reaction bar body 51 (upper end portion of one support bar 52, for example), the rope R2 is routed around the back of the body of the operator O, and the other end of the rope R2 is joined to the support bar 52 located below the reaction bar body 51 (lower end portion of another support bar 52, for example), as shown in FIG. 6. As a result, when the reaction bar 50 receives the reaction force from the tree W and attempts to rotate, the rope R2 joined to the two support bars 52 is supported by the trunk of the operator O to prevent the two support bars 52 from moving, whereby the rotation of the reaction bar 50 can be more stably restricted. To support the support bar 52 located below the reaction bar 50, the tip of the support bar 52 may be in contact with the ground G or may be separate therefrom.

On the other hand, the opposite ends of a rope (not shown) wound around the circumference of the tree W are fixed to the two support bars 52, and the operator O grabs one end of the rope to prevent the support bars 52 from moving when the reaction bar 50 rotates. The support bars 52 each preferable include a fixing portion to which an end of the rope is fixed. Examples of the fixing portion may include a hook or a ring provided on the surface of the support bar 52 or a through hole through which the rope is caused to pass.

Figure 8:
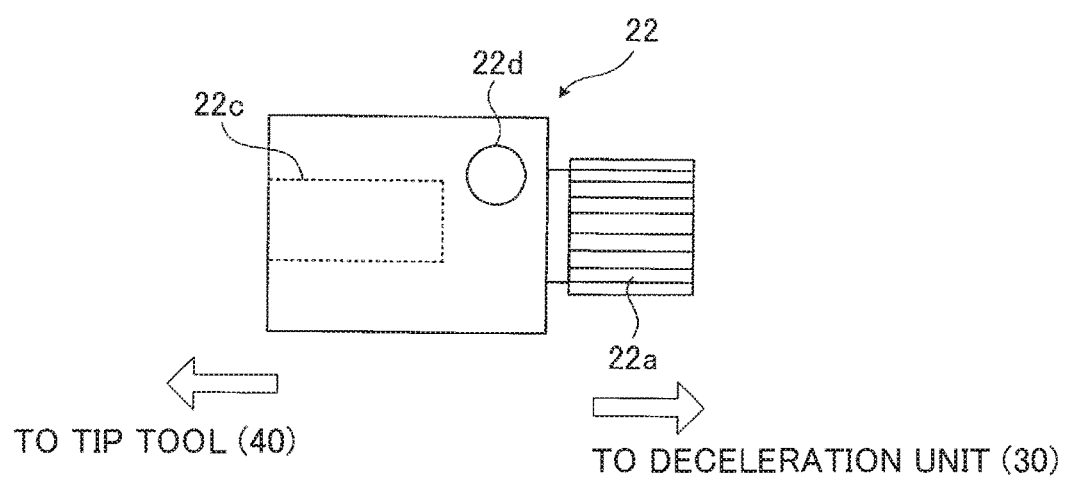
FIG. 8 is a side view of a second socket according to a variation.

In the present embodiment, the rings 22b are provided on the outer circumferential surface of the second socket 22, as shown in FIG. 3, but not necessarily. That is, the rope R1 shown in FIG. 6 only needs to be attached to the second socket 22. For example, the rope R1 can be attached to the second socket 22 by forming a through hole 22d in the second socket 22 and causing the rope R1 to pass through the through hole 22d, as shown in FIG. 8. The through hole 22d may be formed in a position where the through hole 22d does not interfere with the linkage groove 22c. On the other hand, a hook or any other protrusion (corresponding to engagement section) for hooking the rope R1 can be provided on the outer circumferential surface of the second socket 22 in place of the rings 22b shown in FIG. 3.

Figure 9:
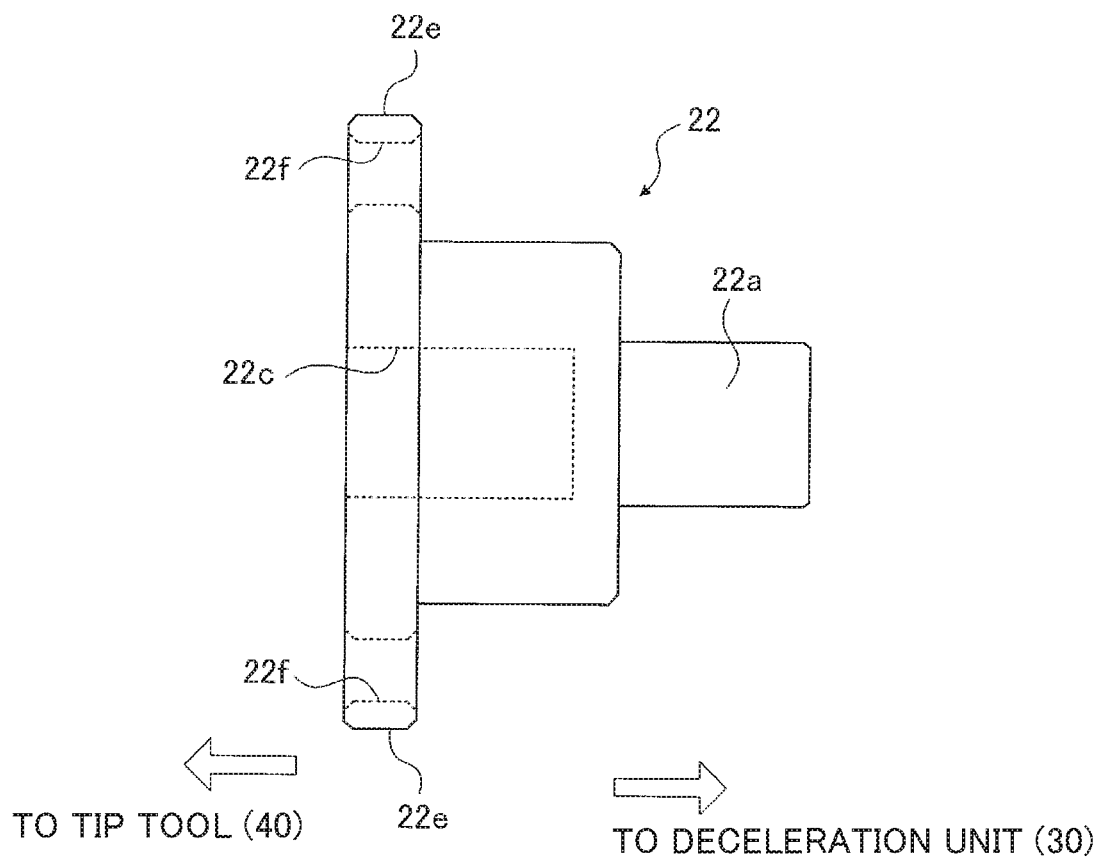
FIG. 9 is a side view of the second socket according to another variation.
Figure 10:
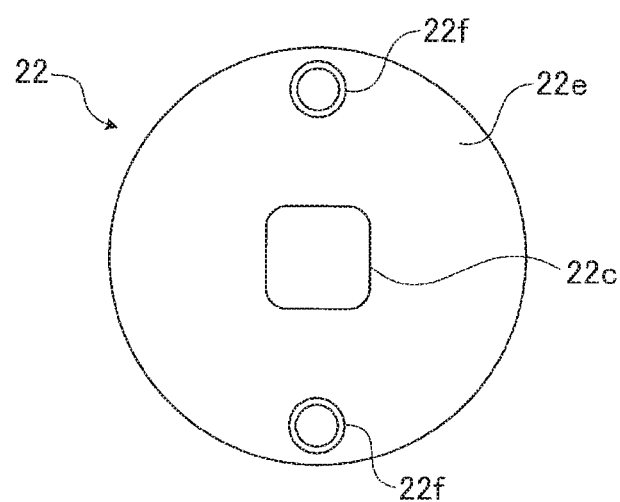
FIG. 10 is a front view of the second socket according to the other variation.

On the other hand, a second socket 22 shown in FIGS. 9 and 10 can be used. FIG. 10 shows the second socket 22 viewed from the side facing the tip tool 40. The second socket 22 includes a flange 22e, which has a pair of through holes 22f, through which the rope R1 shown in FIG. 6 is caused to pass. The linkage groove 22c is formed between the pair of through holes 22f, as shown in FIG. 10.

In the present embodiment, the support bars 52 each have a fixed length and may instead have a variable length. Specifically, the support bars 52 may each be formed of a plurality of sub-bars, and one of the sub-bars may be configured to be capable of accommodating another sub-bar in such a way that the sub-bars can be moved relative to each other in the longitudinal direction of the support bar 52, whereby the length of the support bar 52 can be changed. After the length of the support bar 52 is changed, the plurality of sub-bars may be fixed to each other so that the plurality of sub-bars do not move relative to each other.

Specifically, the support bars 52 may each be provided with an operation member operated by the operator O, and the operator O may operate the operation member to allow movement of the plurality of sub-bars relative to each other or fix the plurality of sub-bars to each other. The operation member can, for example, be a bolt with a knob. In this case, the bolt is caused to pass through the sub-bar located outside another sub-bar, and the tip of the bolt is caused to come into contact with the outer surface of the sub-bar located inside the outer sub-bar. Fastening the bolt allows the plurality of sub-bars to be fixed to each other, whereas loosening the bolt allows the plurality of sub-bars to be moved relative to each other.

As a result, the length of one of the support bars 52 can be adjusted in accordance with the position where the tip tool 40 is used (height from ground G shown in FIG. 6 or 7), whereby work using the tip tool 40 can be efficiently performed. In a case where the length of the support bar 52 is so adjusted that the lower end of the support bar 52 comes into contact with the ground G when the tool device 1 is used, the total weight of the motive force tool 10, the first socket 21, the deceleration unit 30, the reaction bar body 51, and the second socket 22 can be supported by the support bar 52. As a result, the operator O does not need to keep lifting the motive force tool 10 and other components in a predetermined position separate from the ground G, whereby the physical burden on the operator can be reduced.

In the present embodiment, the support bars 52 are each fixed to the reaction bar body 51. The support bars 52 may instead each be allowed to pivot relative to the reaction bar body 51. Structures (two structures) that allow each of the support bars 52 and the reaction bar body 51 to rotate relative to each other will be described below. The support bars 52 may each be so configured that the length thereof is fixed or variable, as described above.

Figure 11:
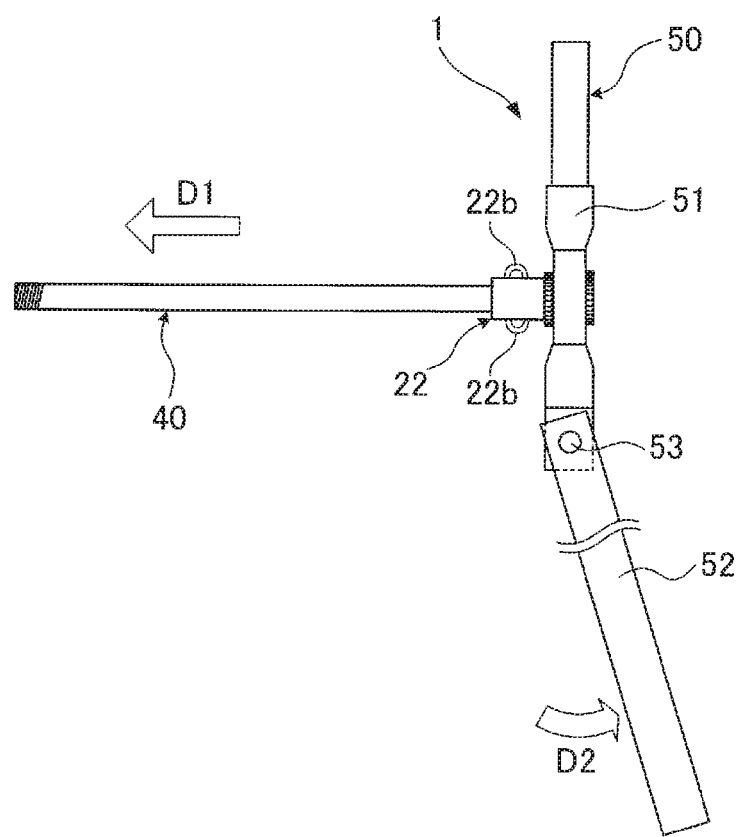
FIG. 11 is a side view showing the structure of a reaction bar according to a variation.

A first structure will be described with reference to FIG. 11. In FIG. 11, the reaction bar body 51 and the support bar 52 are so linked to each other as to be rotatable around a shaft member 53. The axis of rotation of the shaft member 53 extends in the direction perpendicular to the direction in which the tip tool 40 moves (rightward/leftward direction in FIG. 11) and the direction in which the reaction bar body 51 extends (upward/downward direction in FIG. 11) (in other words, the axis of rotation of the shaft member 53 extends in the direction perpendicular to plane of view of FIG. 11).

The structure shown in FIG. 11 allows the support bar 52 to rotate in the direction indicated by the arrow D2 when the tip tool 40 moves in the direction indicated by the arrow D1 (direction toward workpiece). Supporting a tip portion (lower end portion) of the support bar 52 to receive the reaction force acting on the tip tool 40 allows the reaction bar body 51 to move in the direction D1 in which the tip tool 40 moves with no change in the position where the support bar 52 is supported. The tip tool 40 and the reaction bar body 51 can thus be smoothly moved in the direction indicated by the arrow D1.

Figure 12:
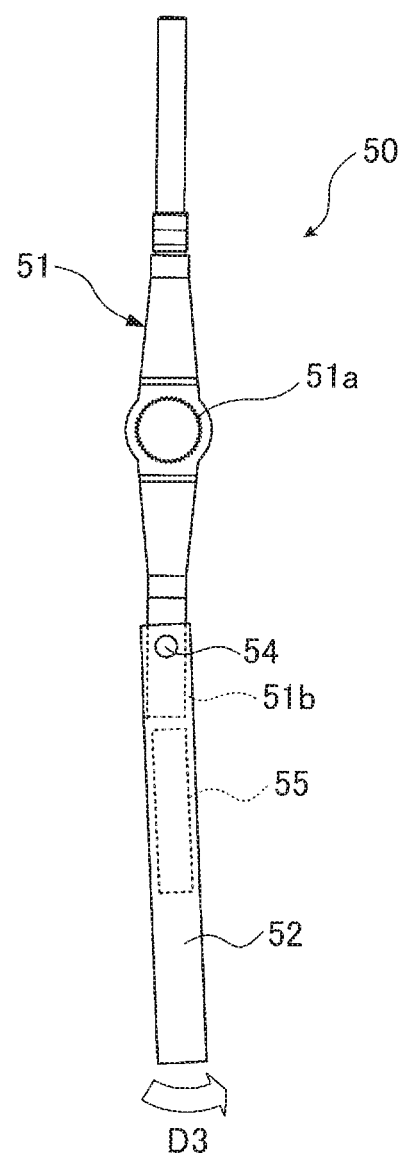
FIG. 12 is a front view showing the structure of the reaction bar according to another variation.

A second structure will next be described with reference to FIG. 12. FIG. 12 shows the reaction bar 50 viewed along the axis of rotation of the tip tool 40.

In FIG. 12, the reaction bar body 51 and the support bar 52 are so linked to each other as to be rotatable around the shaft member 54. The axis of rotation of the shaft member 54 is parallel to the axis of rotation of the tip tool 40. The portion where one of the linkage bars 51b of the reaction bar body 51 is linked to the support bar 52 can be provided with a toggle mechanism 55 using a spring. The toggle mechanism 55 is a known mechanism used in a torque wrench. The toggle mechanism 55 allows each of the linkage bar 51b of the reaction bar body 51 and the support bar 52 to rotate relative to each other when a torque reaches a predetermined torque.

According to the structure shown in FIG. 12, until the torque acting on the reaction bar body 51 reaches the predetermined torque set by the toggle mechanism 55, the reaction bar body 51 and the support bar 52 are integrally movable under the urging force produced by the spring of the toggle mechanism 55. On the other hand, when the torque acting on the reaction bar body 51 reaches the predetermined torque, the reaction bar body 51 and the support bar 52 rotate relative to each other around the shaft member 54 against the urging force produced by the spring of the toggle mechanism 55. Specifically, the support bar 52 rotates relative to the reaction bar body 51 in the direction indicated by the arrow D3. The operator can grasp that the torque acting on the reaction bar body 51 has reached the predetermined torque by recognizing the rotation of the reaction bar body 51 and the support bar 52 relative to each other.

Figure 13:
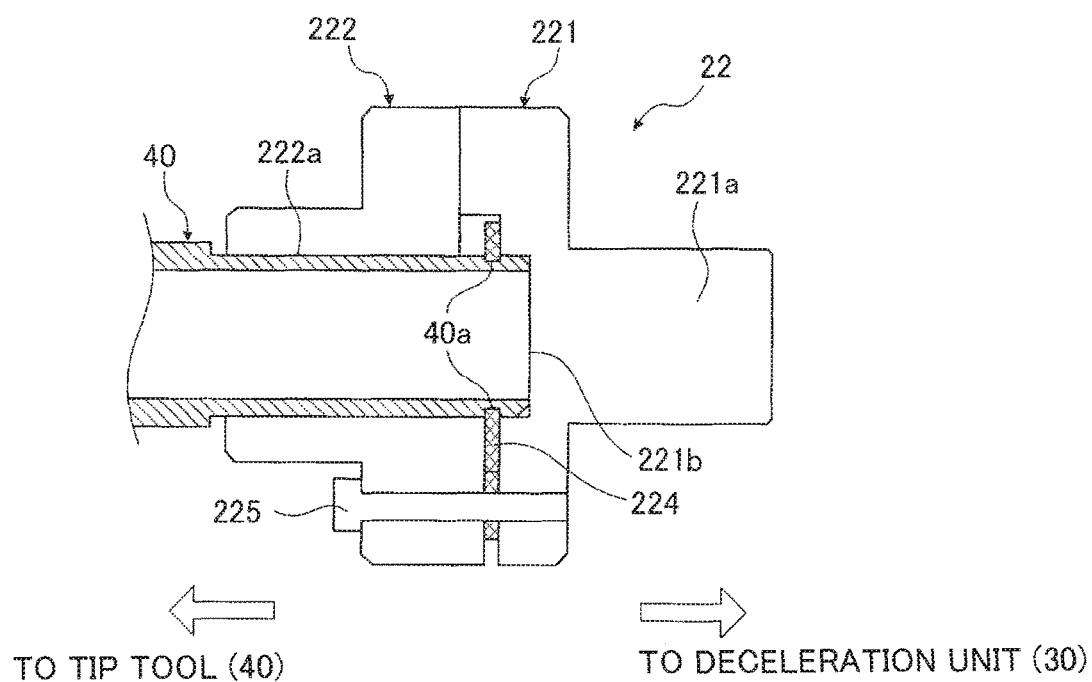
FIG. 13 is a cross-sectional view of the second socket according to another variation.
Figure 14:
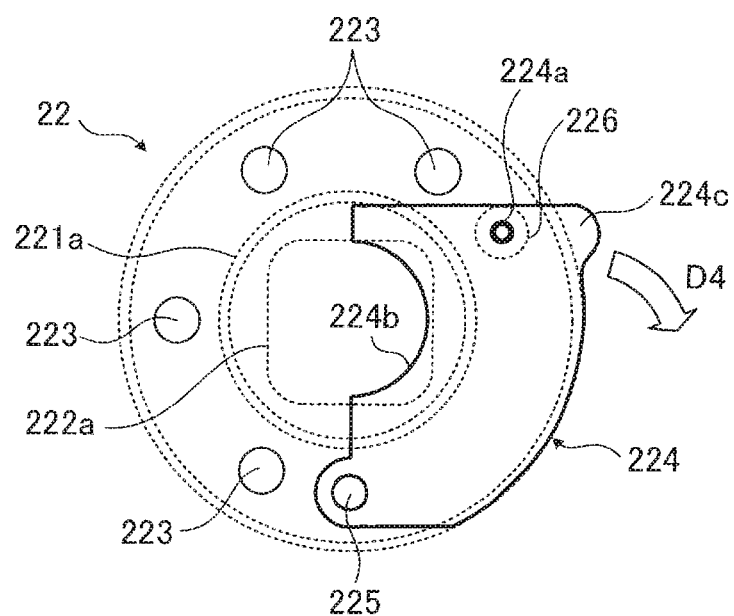
FIG. 14 is a front view of the second socket according to the other variation and shows a stopper member located in a fixation position.
Figure 15:
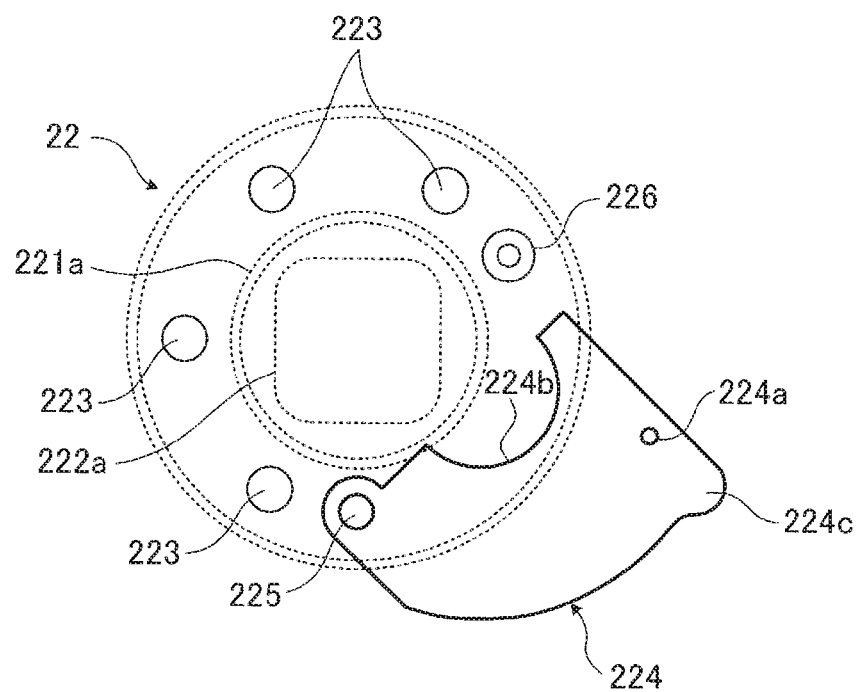
FIG. 15 is a front view of the second socket according to the other variation and shows the stopper member located in a fixation release position.

Another structure of the second socket 22 will next be described with reference to FIGS. 13 to 15. FIG. 13 is a cross-sectional view of the second socket 22. FIGS. 14 and 15 primarily show the position of a stopper member 224, which will be described later.

The second socket 22 includes a first sub-socket 221 and a second sub-socket 222. The first sub-socket 221 includes a spline 221*a* (corresponding to spline 22*a* shown in FIG. 3), which is linked to the deceleration unit 30, and a recess 221*b*, into which the base end portion of the tip tool 40 is inserted. The second sub-socket 222 has a through hole 222*a*, through which the tip tool 40 passes.

The first sub-socket 221 and the second sub-socket 222 are fixed to each other with bolts 223 shown in FIGS. 14 and 15, and the stopper member 224 is disposed between the first sub-socket 221 and the second sub-socket 222, as shown in FIG. 13. A shaft member 225 passes through the second sub-socket 222, the stopper member 224, and the first sub-socket 221, as shown in FIG. 13, and the stopper member 224 rotates around the shaft member 225.

A ball plunger 226 is incorporated in the second socket 22. Specifically, the ball plunger 226 is disposed between the first sub-socket 221 and the second sub-socket 222. When the stopper member 224 is located in the position shown in FIG. 14 (called fixation position), a ball or a pin (not shown) provided at the tip of the ball plunger 226 engages with a hole 224*a* formed in the stopper member 224. The stopper member 224 is therefore held in the fixation position. The stopper member 224 includes an engagement section 224*b* so formed as to follow the outer circumferential surface of the tip tool 40, and when the stopper member 224 is located in the fixation position, the engagement section 224*b* engages with a groove 40*a* (see FIG. 13) formed in the outer circumferential surface of the base end portion of the tip tool 40.

The stopper member 224 includes a knob 224*c*, and when the stopper member 224 is located in the fixation position, the knob 224*c* protrudes beyond the second socket 22. When the operator holds the knob 224*c* and rotates the stopper member 224 in the direction indicated by the arrow D4 shown in FIG. 14, the hole 224*a* of the stopper member 224 disengages from the ball plunger 226, whereby the stopper member 224 can be rotated to the position shown in FIG. 15 (called fixation release position). The fixation release position is not limited to the position of the stopper member 224 shown in FIG. 15 and is a position where the engagement section 224*b* of the stopper member 224 retracts from the groove 40*a* of the tip tool 40. Moving the stopper member 224 to the fixation release position allows the tip tool 40 to be removed from the second socket 22.

When the stopper member 224 is located in the fixation position, the engagement section 224*b* engages with the groove 40*a* of the tip tool 40, whereby the tip tool 40 will not disengage from the second socket 22. Therefore, for example, after the tip portion of the tip tool (borer) 40 is caused to penetrate into a tree, the tip tool 40 can be pulled out of the tree with the tip tool 40 fixed to the second socket 22. For example, moving the second socket 22 in the direction away from the tree allows the tip tool 40 to be pulled out of the tree. As means for moving the second socket 22 in the direction away from the tree, for example, a rope is hooked to the second socket 22, and the second socket 22 can be moved in the direction away from the tree by pulling the rope.

As described above, to pull the tip tool 40 out of the tree, the tip tool 40 can be rotated in the direction opposite the direction in which the tip tool 40 is rotated to penetrate into the tree. In the case where the interior of the tree has decayed, however, the tip tool 40 idles and cannot be pulled out of the tree. Fixing the tip tool 40 to the second socket 22 via the stopper member 224 allows two operators to grab the respective two support bars 52 with the reaction bar body 51 and the support bars 52 set horizontal and pull the support bars 52 in the direction away from the tree to pull the tip tool 40 out of the tree to the position where the treaded portion of the tip tool 40 engages with the tree.

Figure 16:
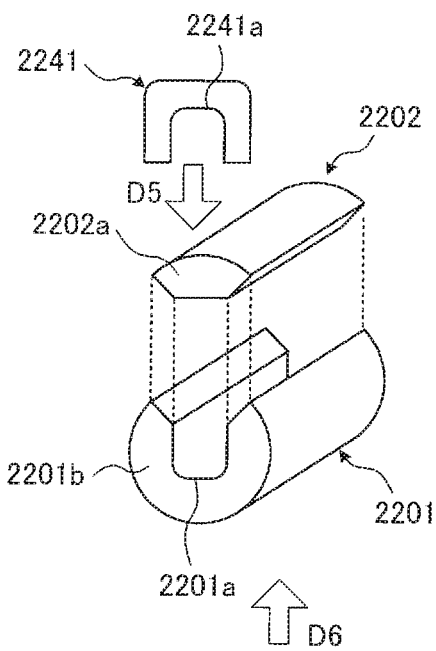
FIG. 16 is a perspective view showing the structure of part of the second socket according to another variation.
Figure 17:
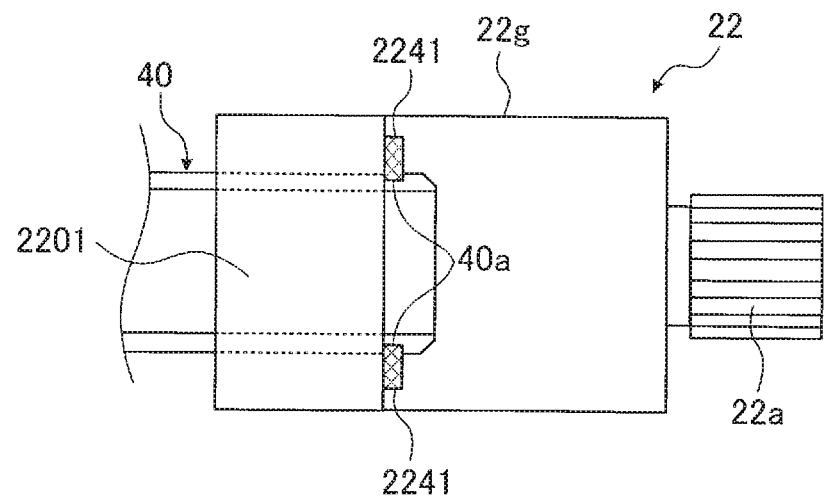
FIG. 17 is a schematic view showing the state in which a tip tool is attached to the second socket according to the other variation.
Figure 18:
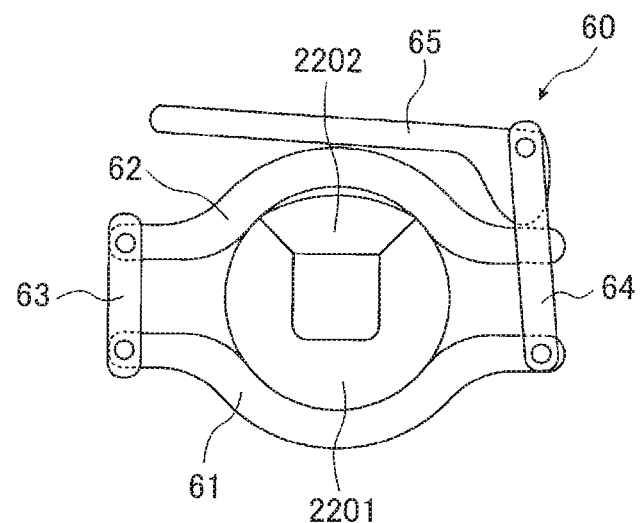
FIG. 18 shows a clamp for fixing the second socket according to the other variation.
Figure 19:
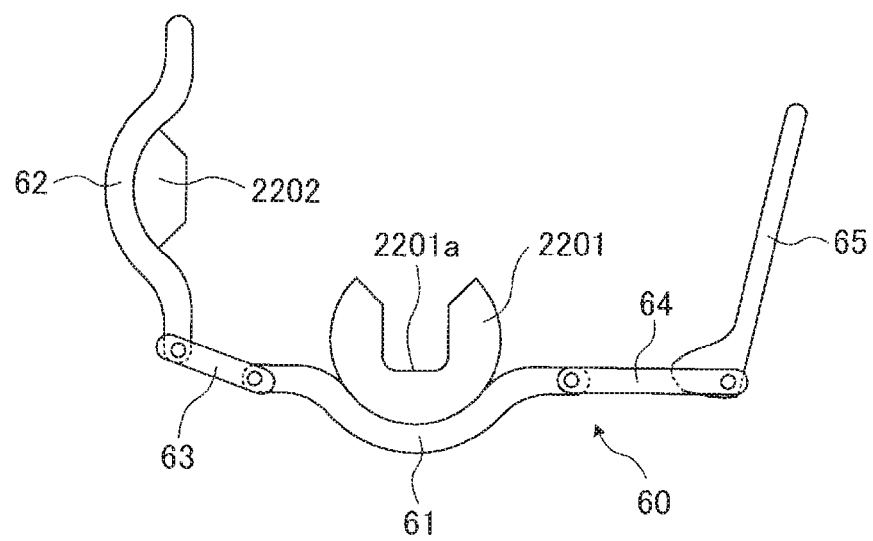
FIG. 19 shows the clamp for fixing the second socket according to the other variation.

Another structure of the second socket 22 will next be described with reference to FIGS. 16 to 19. FIG. 16 is a perspective view showing the structure of part of the second socket 22, and FIG. 17 is a schematic view showing the state in which the tip tool 40 is attached to the second socket 22. FIGS. 18 and 19 show a clamp for fixing the second socket 22.

The second socket 22 includes a first sub-socket 2201, a second sub-socket 2202, and a stopper member 2241, as shown in FIG. 16. The first sub-socket 2201 has a recess 2201*a*, in which the base end portion of the tip tool 40 is accommodated. The second sub-socket 2202 is disposed above the groove 2201*a*, and the lower end surface of the second sub-socket 2202 and the recess 2201*a* of the first sub-socket 2201 surround the base end portion of the tip tool 40.

The stopper member 2241 is so moved in the direction indicated by the arrow D5 shown in FIG. 16 as to be disposed along one end surface 2201*b* of the first sub-socket 2201 and one end surface 2202*a* of the second sub-socket 2202. The stopper member 2241 includes an engagement section 2241*a* so formed as to follow the outer circumferential surface of the tip tool 40, and the engagement section 2241*a* engages with the groove 40*a* (see FIG. 17) formed in the base end portion of the tip tool 40. To accommodate the base end portion of the tip tool 40 in the recess 2201*a*, the groove 40*a* of the tip tool 40 is located outside the first sub-socket 2201 and the second sub-socket 2202. The engagement section 2241*a* is thus allowed to engage with the groove 40*a* of the tip tool 40.

FIG. 17 shows the state in which the first sub-socket 2201 and the second sub-socket 2202 are attached to the base end portion of the tip tool 40 and the engagement section 2241*a* engages with the groove 40*a* of the tip tool 40. FIG. 17 shows the first sub-socket 2201 in the direction indicated by the arrow D6 shown in FIG. 16. The first sub-socket 2201 is fixed to an enclosure 22*g* including the spline 22*a*, as shown in FIG. 17. When the stopper member 2241 engages with the groove 40*a* of the tip tool 40, the stopper member 2241 comes into contact with one end surface 2201*b* of the first sub-socket 2201 and one end surface 2202*a* of the second sub-socket 2202. The tip tool 40 will therefore not disengage from the second socket 22.

A mechanism (clamp) for fixing the first sub-socket 2201 and the second sub-socket 2202 to each other will next be described. Using a clamp 60 shown in FIGS. 18 and 19 allows the first sub-socket 2201 and the second sub-socket 2202 to be fixed to each other. The clamp 60 includes a first arm 61, to which the first sub-socket 2201 is fixed, and a second arm 62, to which the second sub-socket 2202 is fixed. Part of the first arm 61 (central portion) is so shaped as to follow the outer circumferential surface of the first sub-socket 2201, and part of the second arm 62 (central portion) is so shaped as to follow the outer circumferential surface of the second sub-socket 2202.

One end portion of the first arm 61 and one end portion of the second arm 62 are connected to each other via a link 63. The one end portion of the first arm 61 and the link 63 are rotatably connected to each other, and the one end portion of the second arm 62 and the link 63 are rotatably connected to each other. A lever 65 is connected to another end portion of the first arm 61 via a link 64. Not only are the other end portion of the first arm 61 and the link 64 rotatably connected to each other, but the link 64 and a base end portion of the lever 65 are rotatably connected to each other.

In the state of the clamp 60 shown in FIG. 18 (called fixation state), the first sub-socket 2201 and the second sub-socket 2202 can be fixed to each other. In the state of the clamp 60 shown in FIG. 19 (called fixation release state), the first sub-socket 2201 and the second sub-socket 2202 can be separate from each other. In the fixation release state of the clamp 60, the base end portion of the tip tool 40 can be accommodated in the recess 2201*a* of the first sub-socket 2201.

REFERENCE SIGNS LIST

1: Tool device
10: Motive force tool
11: Grip
12: Square drive
13: Switch
21: First socket
22: Second socket
30: Deceleration unit
31: First deceleration mechanism
32: Second deceleration mechanism
33: Enclosure
40: Tip tool
50: Reaction bar
51: Reaction bar body
52: Support bar

The invention claimed is:

1. A tool device comprising:
   a deceleration unit that has a plurality of gears and is configured to increase a torque input from a motive force tool that is held by an operator;
   a boring tip tool configured to rotate upon reception of a motive force from the deceleration unit;
   a reaction bar configured to be fixed to the deceleration unit and allow the operator to stably receive a reaction force produced when the boring tip tool rotates; and
   a socket to which a base end portion of the boring tip tool is attached and which is configured to rotate along with the boring tip tool upon reception of a rotational force from the deceleration unit,
   wherein the socket includes an engagement section that is configured to engage with a engagement to be wound around a workpiece to be bored by rotating the boring tip tool, and
   the engagement section protrudes from, and is rotationally fixed to, an outer circumferential surface of the socket and has a shape of a ring or a hook to form a space through which the rope passes.

2. The tool device according to claim 1, wherein the reaction bar extends in a direction perpendicular to an axis of rotation of the boring tip tool.

3. The tool device according to claim 1, wherein
   the tool device further comprises a stopper member with a plate shape that is configured to fix the base end portion of the boring tip tool to the socket, and
   the stopper member engages with a groove formed in an outer surface of the boring tip tool and comes into contact with the socket to prevent the boring tip tool from disengaging from the socket.

4. The tool device according to claim 3, wherein the stopper member is rotatably attached to the socket such that the stopper member is capable of rotating relative to the socket between a position where the stopper member engages with the groove of the boring tip tool and a position where the stopper member retracts from the groove of the boring tip tool.

5. The tool device according to claim 1, wherein
   the reaction bar includes
   a first reaction bar configured to be fixed to the deceleration unit, and
   at least one second reaction bar detachably attached to the first reaction bar.

6. The tool device according to claim 5, wherein the at least one second reaction bar is two second reaction bars attached to different positions on the first reaction bar and disposed along a direction perpendicular to an axis of rotation of the boring tip tool.

7. The tool device according to claim 1, wherein
   the reaction bar includes
   a first reaction bar configured to be fixed to the deceleration unit, and
   a second reaction bar rotatably linked to the first reaction bar, and
   when the first reaction bar moves along an axis of rotation of the tip tool, the second reaction bar inclines with respect to the first reaction bar.

8. The tool device according to claim 1, wherein
   the reaction bar includes a first reaction bar configured to be fixed to the deceleration unit,
   a second reaction bar rotatably linked to the first reaction bar, and
   a spring mechanism that makes the first reaction bar and the second reaction bar movable relative to one another via a pivot axis parallel to an axis of rotation of the boring tip tool.

9. The tool device according to claim 7, wherein
   the at least one second reaction bar includes a plurality of rod-shaped members adjustable relative to each other along a longitudinal direction of the at least one second reaction bar by loosening the fixing bolt.

10. The tool device according to claim 1, wherein the boring tip tool has a hollow structure and is used as an increment borer.

11. The tool device according to claim 1, further comprising
    the motive force tool generating a torque, and
    an additional socket linking the motive force tool and one end portion of the deceleration unit,
    wherein the socket links the boring tip tool and another end portion of the deceleration unit, the reaction bar being fixed to the deceleration unit through the socket, the motive force tool rotates the boring tip tool with the torque through each of the deceleration unit, the additional socket and the socket, the motive force tool, the additional socket, the deceleration unit, the socket, and the boring tip tool are arranged in an axis of rotation of the boring tip tool, and the reaction bar extends in a direction perpendicular to the axis of rotation of the boring tip tool.

12. The tool device according to claim 11, wherein the boring tip tool includes a groove portion at the base end portion thereof, and the socket includes a stopper member inserted into the groove portion of the boring tip tool to hold the boring tip tool within the socket.

13. The tool device according to claim 12, wherein the socket includes a first sub-socket, a second sub-socket and a shaft member through which the first sub-socket, the second sub-socket and the stopper member are fixed to each other, and the stopper member includes an engagement surface corresponding to an outer circumferential surface of the boring tip tool, and the stopper member rotates around the shaft member to move between a fixation position where the engagement surface is engaged, within the groove portion, against the outer circumferential surface of the boring tip tool to hold the boring tip tool in the socket and a fixation release position where the engagement surface is spaced apart from the boring tip tool to release the boring tip tool from the socket.

* * * * *